US008861896B2

(12) United States Patent
Becker

(10) Patent No.: US 8,861,896 B2
(45) Date of Patent: Oct. 14, 2014

(54) METHOD AND SYSTEM FOR IMAGE-BASED IDENTIFICATION

(75) Inventor: Christoph Becker, Plankstadt (DE)

(73) Assignee: SAP SE, Walldorf (DE)

(*) Notice: Subject to any disclaimer, the term of this patent is extended or adjusted under 35 U.S.C. 154(b) by 285 days.

(21) Appl. No.: 12/955,173

(22) Filed: Nov. 29, 2010

(65) Prior Publication Data

US 2012/0134593 A1    May 31, 2012

(51) Int. Cl.
*G06K 9/60* (2006.01)
*G06K 9/00* (2006.01)

(52) U.S. Cl.
CPC ........ *G06K 9/00979* (2013.01); *G06K 2209/27* (2013.01)
USPC .......................................... 382/305; 382/224

(58) Field of Classification Search
None
See application file for complete search history.

(56) References Cited

U.S. PATENT DOCUMENTS

| | | | |
|---|---|---|---|
| 2005/0185060 A1* | 8/2005 | Neven, Sr. | 348/211.2 |
| 2006/0012677 A1* | 1/2006 | Neven et al. | 348/61 |
| 2006/0240862 A1* | 10/2006 | Neven et al. | 455/550.1 |
| 2007/0088692 A1* | 4/2007 | Dean et al. | 707/5 |
| 2009/0175509 A1* | 7/2009 | Gonion et al. | 382/118 |
| 2011/0125735 A1* | 5/2011 | Petrou | 707/723 |
| 2011/0305394 A1* | 12/2011 | Singer et al. | 382/190 |

OTHER PUBLICATIONS

Helft, "Snap and Search (No Words Needed)," The New York Times, Dec. 20, 2009.*
Rosenthal and Sciore, "Administering Propagated Metadata in Large, Multi-layer Database Systems," IEEE Workshop on Knowledge and Data Exchange, 1999.*
Ponce et al., "Dataset Issues in Object Recognition," Toward Category-Level Object Recognition, LNCS 4170, pp. 29-48, 2006.*
Cai, Deng, et al. "Hierarchical clustering of WWW image search results using visual, textual and link information." Proceedings of the 12th annual ACM international conference on Multimedia. ACM, 2004.*
Gong, Zhiguo, Leong U, and Chan Cheang. "An implementation of web image search engines." Digital Libraries: International Collaboration and Cross-Fertilization (2005): 677-698.*
Chang, Edward Y., et al. "Rime: A replicated image detector for the world wide web." Photonics East (ISAM, VVDC, IEMB). International Society for Optics and Photonics, 1998.*
http://mashable.com/2010/11/22/amazon-price-check-iphone/.
http://www.businessinsider.com/use-the se-price-comparision-apps-to-get-the-best-deal-2011-1?op=1.

* cited by examiner

*Primary Examiner* — Bhavesh Mehta
*Assistant Examiner* — Andrew Moyer
(74) *Attorney, Agent, or Firm* — Kenyon & Kenyon LLP

(57) ABSTRACT

The present invention may provide a method for image-based identification. The method may include providing a digital photo of an unidentified item; transmitting, over a network, the digital photo to an identification service; in response to transmitting the digital photo, receiving, over the network, item information from the identification service, wherein the item information includes textual identification information about the item; and displaying the textual identification information.

26 Claims, 6 Drawing Sheets

100

300

400

600

| IMAGE METADATA | REFERENCE |
|---|---|
| Metadata A | Reference A1 |
| | Reference A2 |
| | Reference A3 |
| Metadata B | Reference B1 |
| Metadata C | Reference C1 |
| | Reference C2 |

FIG. 7
700

METHOD AND SYSTEM FOR IMAGE-BASED IDENTIFICATION

BACKGROUND

Today, there is an overabundance of information. The Internet and private networks contain large amounts of data. The problem, though, is sifting through all the information to find relevant information. Different techniques have been developed to search for relevant information. However, searching techniques have concentrated on text based information. Consequently, identifying an unknown object is not supported appropriately.

Even conventional image searching techniques use text as the searching material. In conventional systems, textual information is usually manually created and tagged with the image. The textual information is the only searchable material for the image. There is no general and publicly available system to search for images themselves. Furthermore, conventional systems focus on locating images rather than providing identification information and knowledge about unknown objects.

Moreover, there is no system to help identify unidentified objects and persons without using a text search of some kind. In many situations, a user may see an object and is unable to identify it. However there may exist information that links the object or a representation of the object like an image to identification information about the object. For example, an encyclopedia links information and knowledge about a person like name, biography, historical information etc. to an image of the person. Typically, the image information in an encyclopedia is not indexed and requires a high effort when searching an image without having identified the corresponding object. Today, digital media like databases or the Internet provide large amounts of image data that is related to information and knowledge to the objects shown on the images. However, searching information and knowledge about an object using image representation is not supported. As a result, the user has no way to access the vast information stored on the Internet and private networks to help him/her identify the object. Therefore, a need exists in the art for an image-based identification system.

BRIEF DESCRIPTION OF THE DRAWINGS

FIG. 7 illustrates a database record according to an embodiment of the present invention.

DETAILED DESCRIPTION

An embodiment of the present invention provides a method for image-based identification. The method may include providing a digital photo of an unidentified item; transmitting, over a network, the digital photo to an identification service; in response to transmitting the digital photo, receiving, over the network, item information from the identification service, wherein the item information includes textual identification information about the item; and displaying the textual identification information.

According to another embodiment of the present invention, a method is provided that includes receiving a photo of an item over a communication network from a device; applying a detection algorithm on the photo to generate photo image metadata; searching a database for the image metadata; matching the photo image metadata with stored image data in the database, wherein the stored image data includes image metadata and reference identification information for each image stored in the database; in response to matching the photo image metadata, retrieving the reference identification information for the matched image metadata from the database; and transmitting the reference identification information to the device over the communication network.

According to another embodiment of the present invention, a method is provided that includes scanning images from a plurality of source locations; for each scanned image, creating image identification metadata from the scanned image and creating image reference information from the source of the scanned image; and storing, in a database, the image identification metadata and the image reference information.

An embodiment of the present invention provides an apparatus for image-based identification. The apparatus may include a processor to control operations of the apparatus; a memory to store a photo of an item; a communication system comprising a transmitter to transmit the photo over a communication network and a receiver to receive identification information for the item in response to transmitting the photo; and a display to display the identification information.

According to another embodiment of the present invention, a system is provided for image-based identification that includes a communication system to receive a request to identify an item in a photo and to transmit identification information in response to the request; a processor to apply a detection algorithm on the photo to generate photo image metadata; and a database that stores image metadata and corresponding identification information.

Figure 1:
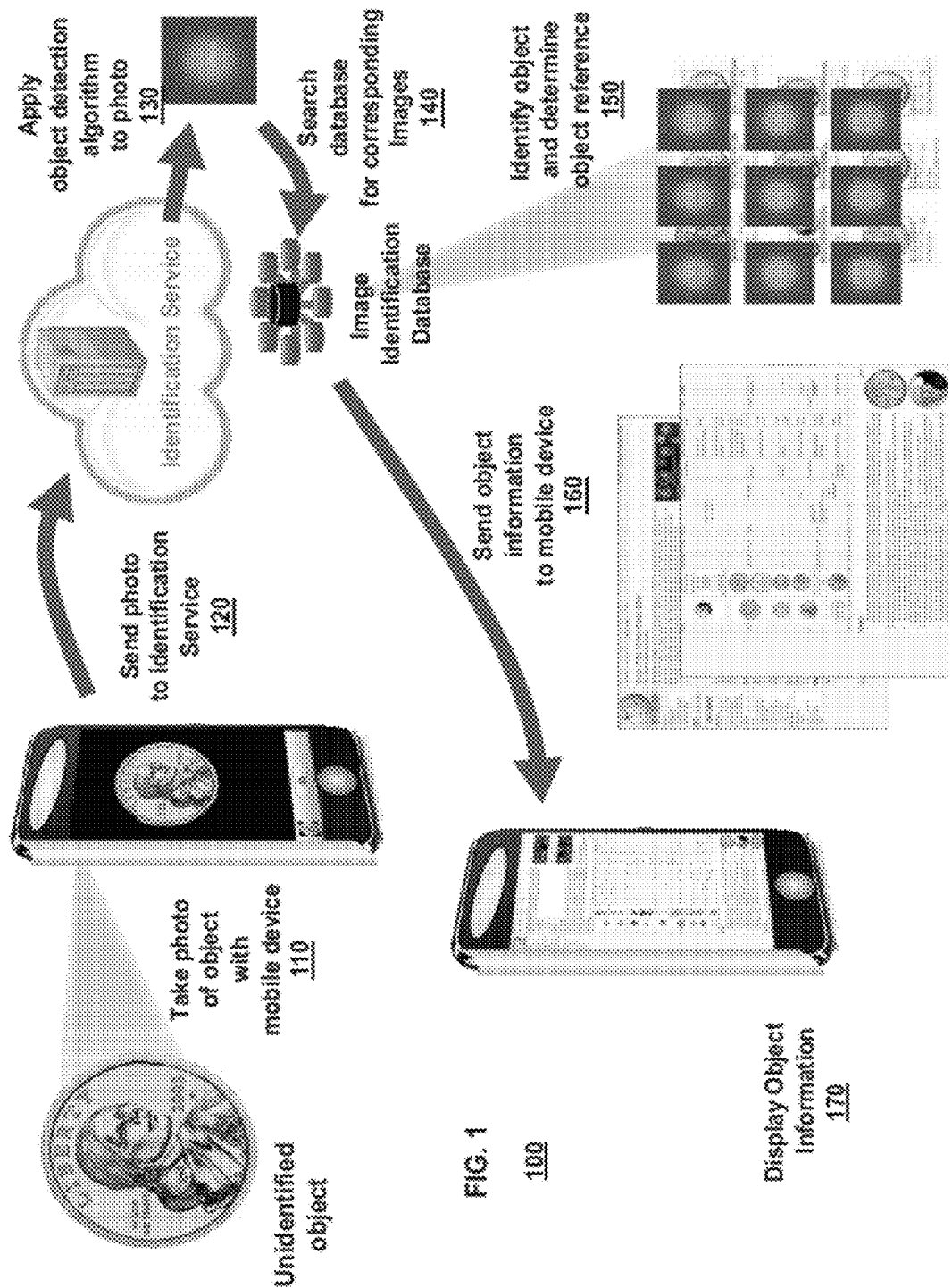
FIG. 1 is a logic flow diagram according to an embodiment of the present invention.

FIG. 1 illustrates an image identification method 100 according to an embodiment of the present invention. In method 100, a user may take a photo of an object with a mobile device (step 110). The object may not be known to the user and thus may be an unidentified object. Identifying an object may be understood in the context of this invention in the following way: When the user visually perceives an object or image of an object and can either name the object or assign the object to knowledge of either mental, lexical or any other type of information representation about the object, then the object is identified by the user and is, from the user's point of view, an identified object. In the case the user is not able to do that, the object is, from the user's point of view, unidentified.

The device used in step 110 may be a mobile phone, a digital camera, a personal digital assistant, a tablet, a laptop, a personal computer, or any suitable device. Alternatively, the user may retrieve the photo from a storage device on the mobile device. Alternatively, the user may access the photo from an application running on the mobile device. For example, the user may access the photo on a webpage running on a browser application on the mobile device.

The user may send the photo to an identification service (step 120). The identification service may be located remotely to the mobile device, and the mobile device may transmit the photo over a network to the identification service. The network may be a wired network such as a computer network or a wireless network such as a cellular network, WLAN network, short range communication network (i.e. BLUE-TOOTH®) or a combination of different wired and/or wireless networks.

According to an embodiment of the present invention, the user may initiate an image identification service application on the mobile device to transmit the photo or other suitable techniques. The address of the identification service may be pre-stored on the mobile device or may be retrieved by the image identification service application.

The identification service may apply an object detection algorithm to the received photo (step 130). The object detection algorithm may scan the photo and generate corresponding image metadata. The object detection algorithm may be a suitable commercially available object detection technique. In an embodiment of the present invention, the identification service may utilize a plurality of different object detection algorithms that may be applied in parallel. Some object detection algorithms may be better suited for certain objects than other algorithms. Therefore, applying different object detection algorithms in parallel may increase the reliability of the results. The image metadata may be a data structure based on the object properties. The image metadata may have the structure that is used or created by the object detection algorithm that is applied. The image metadata may be an index type information that enables images to be searchable by image structure and content.

The identification service may then search a database for corresponding images (step 140). The identification service may compare the generated image metadata with stored image metadata in the database to identify the object in the photo. The comparison may include using a similarity function for comparing the generated image metadata with stored image metadata in the database. The similarity function may have a threshold value where an output of the similarity function above the threshold value may indicate a match. The similarity function may compare the generated image metadata with every stored image metadata. Alternatively, the identification service may first narrow possible matches to a particular group of images stored in the database, and the similarity function may only compare the generated image metadata with the stored image metadata belonging to the narrowed group.

Upon matching the generated image metadata with stored image metadata, the identification service may retrieve object information related to the matched stored image metadata (step 150). The object information may be data that includes identification information of the matched image metadata. The object reference information may be textual data. In one embodiment, the object reference information may be a website link (URL address) that contains information about the image.

The identification service may send the object information to the mobile device that sent the photo (step 160). The identification service may transmit the object information to the mobile device in the same communication session that the mobile device used to transmit the photo to the identification service. Alternatively, the identification service may open a new communication session with the mobile device to transmit the object information. In another embodiment, the identification service may send the object information in a SMS message, an email, or other suitable messaging techniques.

The mobile device may then display the received object information (step 170). The mobile device may display the object information automatically upon receiving the object information or upon a user action. If the object information includes a website link, the mobile device may display the contents of the website. The user may then be able to access the information provided on the display and identify the object in the photo.

Method 100, consequently, may provide a fast and efficient technique to identify unknown objects by using image comparison technology. Method 100 may also provide an accurate identification technique because it uses image metadata to find identification information.

Figure 2:
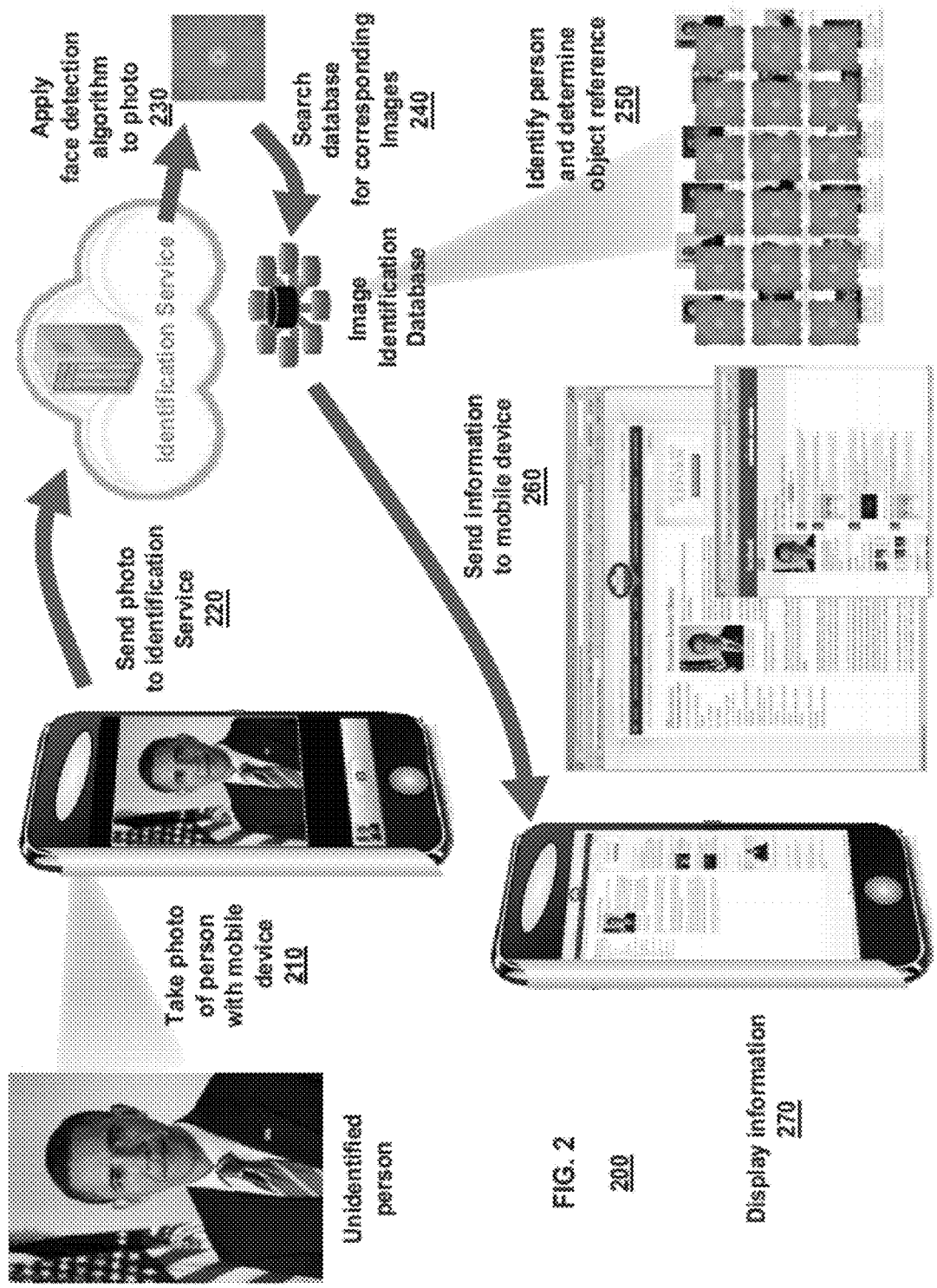
FIG. 2 is a logic flow diagram according to an embodiment of the present invention.

The present invention may also be used to identify persons as well as objects. FIG. 2 illustrates an image identification method 200 according to an embodiment of the present invention that identifies an unidentified person. In method 200, a user may take a photo of a person with a mobile device (step 210). The person may not be known to the user and thus may be an unidentified person. The device used in step 210 may be a mobile phone, a digital camera, a personal digital assistant, a tablet, a laptop, a personal computer, or any suitable device. Alternatively, the user may retrieve the photo from a storage device on the mobile device. Alternatively, the user may access the photo from an application running on the mobile device. For example, the user may access the photo on a webpage running on a browser application on the mobile device.

The user may send the photo to an identification service (step 220). The identification service may be located remotely to the mobile device, and the mobile device may transmit the photo over a network to the identification service. The network may be a wired network such as a computer network or a wireless network such as a cellular network, WLAN network, short range communication network (i.e. BLUE-TOOTH®) or a combination of different wired and/or wireless networks.

According to an embodiment of the present invention, the user may initiate an image identification service application on the mobile device to transmit the photo or other suitable techniques. The address of the identification service may be pre-stored on the mobile device or may be retrieved by the image identification service application.

The identification service may apply a face detection algorithm to the received photo (step 230). The face detection algorithm may scan the photo and generate corresponding image metadata. The face detection algorithm, for example, may use facial features such as eyes, nose, mouth, etc. as typical landmarks of a face, and apply metrics and other classification methods to characterize the face. The face detection algorithm may be a suitable commercially available face detection technique. In an embodiment of the present invention, the identification service may utilize a plurality of different face detection algorithms that may be applied in parallel. Some face detection algorithms may be better suited for certain person images than other algorithms. Therefore, applying different face detection algorithms in parallel may increase the reliability of the results. The image metadata may be a data structure based on the person's facial features. The image metadata may have the structure that is used or created by the face detection algorithm that is applied. The image metadata may be an index type information that enables images to be searchable by image structure and content.

The identification service may then search a database for corresponding images (step 240). The identification service may compare the generated image metadata with stored image metadata in the database to identify the person in the photo. The comparison may include using a similarity function for comparing the generated image metadata with stored image metadata in the database. The similarity function may have a threshold value where an output of the similarity function above the threshold value may indicate a match. The similarity function may compare the generated image metadata with every stored image metadata. Alternatively, the identification service may first narrow possible matches to a particular group of images stored in the database, and the similarity function may only compare the generated image metadata with the stored image metadata belonging to the narrowed group.

Upon matching the generated image metadata with stored image metadata, the identification service may retrieve object information related to the matched stored image metadata (step 250). The object information may be data that includes identification information of the person. The object reference information may be textual data. In one embodiment, the object reference information may be a website link (URL address) that contains information about the person.

The identification service may send the object information to the mobile device that sent the photo (step 260). The identification service may transmit the object information to the mobile device in the same communication session that the mobile device used to transmit the photo to the identification service. Alternatively, the identification service may open a new communication session with the mobile device to transmit the object information. In another embodiment, the identification service may send the object information in a SMS message, an email, or other suitable messaging techniques.

The mobile device may then display the received object information (step 270). The mobile device may display the object information automatically upon receiving the object information or upon a user action. If the object information includes a website link, the mobile device may display the contents of the website. The user may then be able to access the information provided on the display and identify the person.

Figure 3:
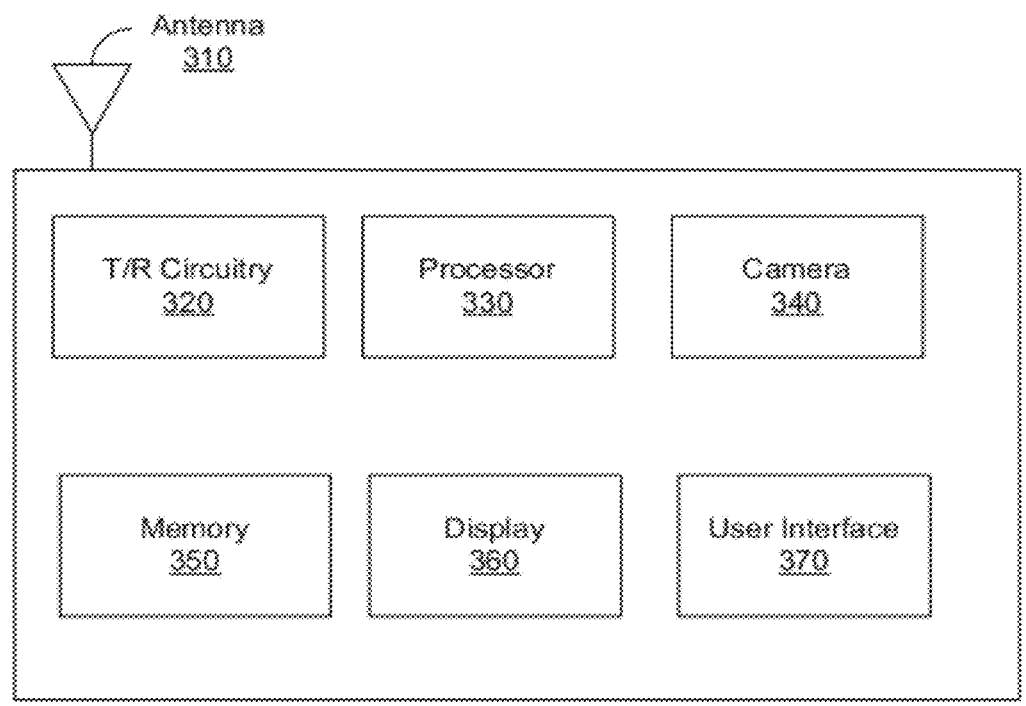
FIG. 3 is a simplified block diagram according to an embodiment of the present invention.

FIG. 3 is a simplified block diagram of a mobile device 300 according an embodiment of the present invention. The mobile device 300 may include an antenna 310, transmitter/receiver circuitry 320, a processor 330, a camera 340, a memory 350, a display 360, and a user interface 370. The antenna 310 may receive and transmit radio frequency waves. The transmitter/receiver circuitry 320 may be coupled to the antenna. The transmitter/receiver circuitry may process received messages and may process messages to be transmitted. The transmitter/receiver circuitry 320 may be a wireless Internet interface, cellular network interface, BLUETOOTH® interface, or any suitable wireless communications interface. Alternatively, the transmitter/receiver circuitry 320 may be a wired communication interface.

The processor 330 may control the operations of the mobile device 300 its components. The processor 300 may be any of a, or combination of, conventional processing systems, including microprocessors, digital signal processors, and field programmable logic arrays.

The camera 340 may be a digital camera that captures photos. The camera 340 may also be a video camera that captures videos. The camera 340 may include a zooming function, auto-focusing function, and/or other suitable camera functions. The memory 350 may store program instructions as well as other data, for example, photos captured by the camera 340. Memory 350 may include any combination of conventional memory circuits, including, electrical, magnetic, or optical memory systems. For example, memory 340 may include read only memories, random access memories, and bulk storage.

The user may interact with the mobile device with the display 360 and user interface 370. The display 360 may be, for example, an LCD screen, a CRT, a plasma screen, an LED screen or the like. The user interface 370 may be a keyboard, a mouse, touch screen sensors or any other user input device that would allow a user to interact with the mobile device 300. The user interface 370 may include hard keys and/or soft keys. The display 360 and user interface 370 may be integrated in the form of a touch screen display, for example.

Figure 4:
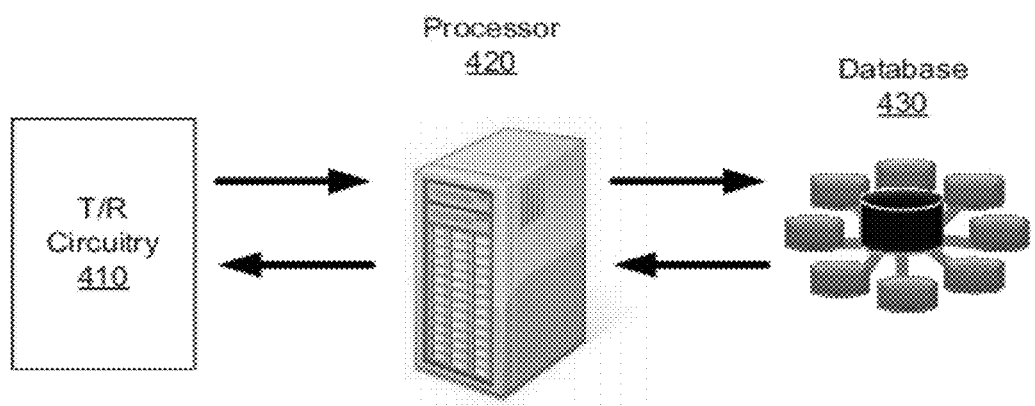
FIG. 4 is a simplified block diagram according to an embodiment of the present invention.

FIG. 4 is a simplified block diagram of an identification service 400 according an embodiment of the present invention. The identification service 400, for example, may be provided on a server. The identification service 400 may include transmitter/receiver circuitry 410, a processor 420, and a database 430. The components of the identification service 400 may be located in one location or may be spread across a network.

The transmitter/receiver circuitry 410 may process received messages from the mobile device and may process messages to be transmitted to the mobile device. The transmitter/receiver circuitry 410 may be a wireless Internet interface, cellular network interface, BLUETOOTH® interface, or any suitable wireless communications interface. Alternatively, the transmitter/receiver circuitry 410 may be a wired communication interface.

The processor 420 may control the operations of the mobile device 300 its components. The processor 420 may be any of a, or combination of, plurality of conventional processing systems, including microprocessors, digital signal processors, and field programmable logic arrays.

The database 430 may contain stored images, image metadata, and/or object information. The database 430 may include a plurality of database dispersed over the network. The database 430 may link image metadata and correlating objection information as will be discussed in greater detail below.

Figure 5:
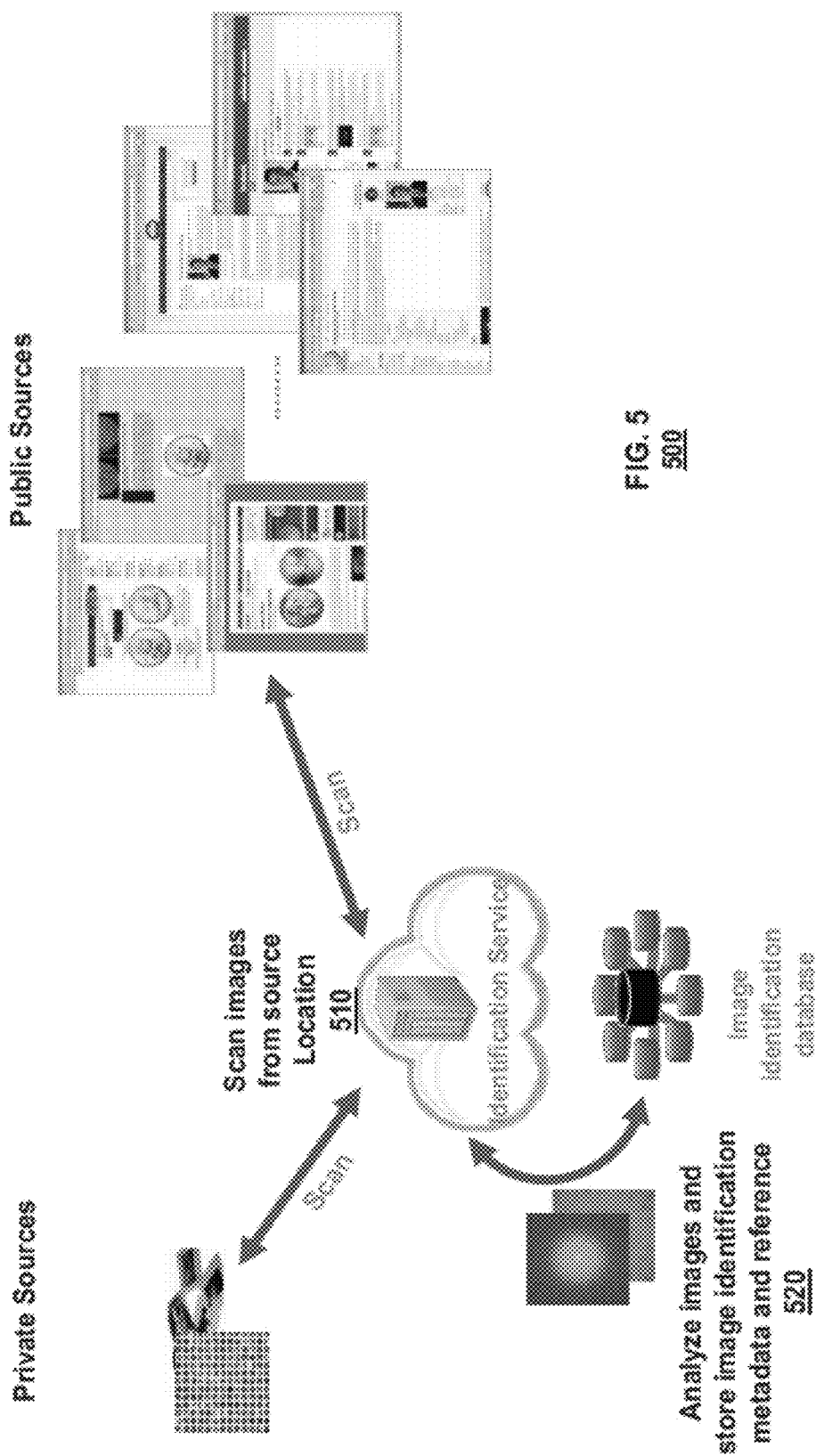
FIG. 5 is a logic flow diagram according to an embodiment of the present invention.

FIG. 5 illustrates an image identification method 500 to populate the image identification service according to an embodiment of the present invention. The identification service may scan images from a source location (step 510). The source location may be a private source such as a company database. The source location may be a public source such as the Internet, and the identification service may crawl websites and scan images provided therein. Alternatively, the source location may be a combination of private and public sources.

The image identification method 500 may then analyze the scanned images and create image identification metadata and object reference information for each scanned image (step 520). In an embodiment of the present invention, different object detection algorithms that may be applied in parallel to create image identification metadata and object reference information for each scanned image. The information may then be stored in the image identification database.

Figure 6:
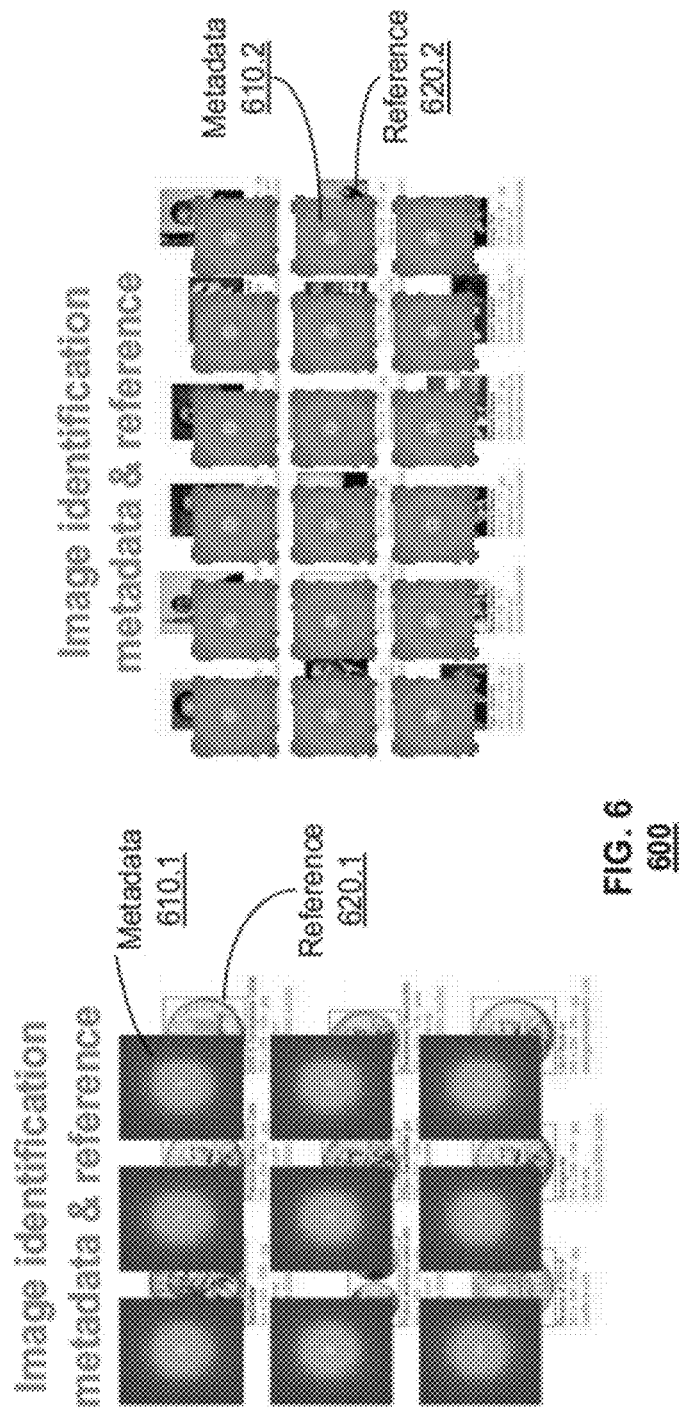
FIG. 6 illustrates a data structure according to an embodiment of the present invention.

FIG. 6 illustrates a simplified diagram of the information stored in the image identification database. For each scanned image of an object, image metadata 610.1 and reference 620.1 may be stored. The reference 620.1 may be information from where the image was obtained and may contain identification information for the object in the image. Similar images may be stored together in groups. If different object detection algorithms that use different metadata structures are applied, all structures may be stored for later application. Consequently, there may be a plurality of metadata layers for each image. In one embodiment of the present invention, image metadata 610.2 and reference 620.2 may be stored for each image of a person scanned. Images of the same person, as determined by the image metadata, or similar looking people (i.e. similar facial features) may be stored together in groups.

Moreover, a scanned image may correspond to a plurality of references. For example, an image may be found on a plurality of websites, each website containing identification information of the object in the image. The image identification database may store a plurality of references for one image metadata.

FIG. 7 illustrates an example of a database record for three different images A, B, and C according to an embodiment of the present invention. For example, metadata A may be the generated image metadata for scanned image A, which may have three different references A1, A2, and A3. The references may be arranged according to a ranking technique. In this example, Reference A1 is the highest ranked reference and Reference A3 is the lowest ranked reference. The ranking may correspond to reliability of the references. For example, government websites may be ranked higher than personal websites. When a received photo matches an image with a plurality of references, the image identification service may retrieve and transmit all the corresponding references. Alternatively, the image identification service may retrieve and transmit only the highest ranked reference or a certain number of references according to their ranks.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

I claim:

1. A method, comprising:
providing a digital photo of an unidentified item;
transmitting, over a network, the digital photo to an identification service;
in response to transmitting the digital photo, receiving, over the network, item information from the identification service, wherein the item information includes a highest ranked textual identification information result about the item and includes information relating to a highest ranked source of a matched scanned image at the identification service, wherein
the rank of the source is based on a predefined parameter;
the identification service is automatically populated with scanned image data, for a plurality of scanned images from various sources, generated by a plurality of detection algorithms operating in parallel, wherein, for each scanned image,
the scanned image data comprises scanned image metadata corresponding to each detection algorithm stored in a scanned image multi-layered data structure,
the detection algorithms generate scanned image metadata with different metadata structures;
the scanned image multi-layered data structure comprises a plurality of metadata layers corresponding to the different scanned image metadata structures generated by the detection algorithms; and
the scanned image metadata is compared with other scanned imaged metadata and if there is a match, grouping image reference information for the matched images together; and
displaying the textual identification information.

2. The method of claim 1, wherein the item is an object.

3. The method of claim 1, wherein the item is a person.

4. The method of claim 1, wherein the network is a wireless network.

5. The method of claim 1, wherein the providing the digital photo is taking a digital photo with a camera.

6. A method, comprising:
receiving a photo of an item over a communication network from a device;
applying a plurality of detection algorithms operating in parallel on the photo to generate unique photo image metadata corresponding to each detection algorithm, wherein the detection algorithms generate photo image metadata with different metadata structures;
storing the photo image metadata in a photo image multi-layered data structure, wherein the multi-layered data structure comprises a plurality of metadata layers corresponding to the different photo image metadata structures generated by the detection algorithms;

searching a database for the photo image metadata, wherein the database is populated with scanned image data, for a plurality of scanned images automatically collected from various sources, generated by the plurality of detection algorithms operating in parallel, wherein, for each scanned image, the scanned image data comprises scanned image metadata corresponding to each detection algorithm stored in a scanned image multi-layered data structure and the detection algorithms generate scanned image metadata with different metadata structures;

matching the photo image metadata with the scanned image data in the database, wherein the scanned image data further comprises a plurality of ranked reference identification information for each image stored in the database, wherein reference identification information includes information relating to a source of the corresponding stored image and the reference identification information is ranked based on the corresponding source, wherein the rank is based on a predetermined parameter;

in response to matching the photo image metadata, retrieving only the highest ranked reference identification information for the matched scanned image metadata from the database; and transmitting only the highest ranked reference identification information to the device over the communication network.

7. The method of claim 6, wherein the item is an object.

8. The method of claim 7, wherein one of the detection algorithms is an object detection algorithm.

9. The method of claim 6, wherein the item is a person.

10. The method of claim 7, wherein one of the detection algorithms is a face detection algorithm.

11. The method of claim 6, wherein the communication network is a wireless network.

12. The method of claim 6, further comprising retrieving and transmitting all the corresponding reference identification information.

13. A method, comprising:
automatically crawling a plurality of source locations;
scanning images from the plurality of source locations using a plurality of detection algorithms operating in parallel;
for each scanned image,
  automatically creating scanned image identification metadata from the scanned image using each of the detection algorithms and creating image reference information from the source of the scanned image, wherein each detection algorithm generates scanned image identification metadata with different metadata structures;
  comparing scanned image identification metadata with other scanned imaged identification metadata; and
  if there is a match, grouping image reference information for the matched images together;
storing, in a database, the scanned image identification metadata and the image reference information, and for each scanned image, storing the scanned image identification metadata created by each detection algorithm in corresponding metadata layers of a multi-layered data structure;
ranking the image reference information according to a rank of the source location for each image reference information, wherein the rank of the source is based on a predefined parameter; and
transmitting only the highest ranked image reference information.

14. The method of claim 13, wherein the image is a picture of an object.

15. The method of claim 13, wherein the image is a picture of a person.

16. The method of claim 13, wherein at least one source location is a website from the world wide web.

17. The method of claim 13, wherein at least one source location is a private database.

18. An apparatus, comprising:
a processor to control operations of the apparatus;
a memory to store a photo of an item;
a communication system comprising a transmitter to transmit the photo over a communication network and a receiver to receive only a highest ranked identification information result of a plurality of ranked identification information for the item in response to transmitting the photo, wherein the identification information includes information relating to a highest ranked source of a matched stored image at an identification service and the source is ranked based on a predetermined parameter, wherein
  the identification service is automatically populated with stored image data for a plurality of scanned images, from various sources, generated by a plurality of detection algorithms operating in parallel, wherein, for each scanned image:
    the stored image data comprises scanned image metadata corresponding to each detection algorithm stored in a scanned image multi-layered data structure;
    the detection algorithms generate scanned image metadata with different metadata structures;
    the scanned imaged multi-layered data structure comprises a plurality of metadata layers corresponding to the different scanned image metadata structures generated by the detection algorithms;
    the scanned image metadata is compared with other scanned imaged metadata and if there is a match, grouping image reference information for the matched images together; and
a display to display the identification information.

19. The apparatus of claim 18 further comprising a camera to take the photo.

20. The apparatus of claim 18, wherein the communication system is a wireless communication system.

21. The apparatus of claim 18, wherein the item is an object.

22. The apparatus of claim 18, wherein the item is a person.

23. A system, comprising:
a communication system to receive a request to identify an item in a photo;
a database to store scanned image metadata comprising scanned image identification information, wherein the database is automatically populated with scanned image metadata generated by a plurality of detection algorithms operating in parallel on a plurality of scanned images automatically collected from various sources, wherein, for each scanned image,
  each detection algorithm generates scanned image metadata with different metadata structures and the database stores scanned image metadata created by each detection algorithm in corresponding metadata layers of a multi-layered data structure;

comparing scanned image identification information with other scanned imaged identification information; and if there is a match, grouping image reference information for the matched images together, a processor to rank the identification information based on a source of the identification information, apply the plurality detection algorithms on the photo to generate photo image metadata corresponding to each algorithm, and to match the photo image metadata with the scanned image metadata in the database, wherein the communication system is configured to transmit only the highest ranked identification information in response to the request, the identification information including information relating to a highest ranked source of the corresponding scanned image, wherein the rank of the source is based on a predefined parameter.

24. The system of claim 23, wherein the communication system is a wireless communication system.

25. The system of claim 23, wherein the item is an object.

26. The system of claim 23, wherein the item is a person.

* * * * *